United States Patent
Bloebaum et al.

(10) Patent No.: US 8,116,680 B2
(45) Date of Patent: *Feb. 14, 2012

(54) NEAR FIELD COMMUNICATION SEARCH FOR MOBILE COMMUNICATION DEVICES

(75) Inventors: L. Scott Bloebaum, Cary, NC (US); William O. Camp, Jr., Chapel Hill, NC (US); Gregory A. Dunko, Cary, NC (US); Daniel P. Homiller, Cary, NC (US); Charles Liu, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 565 days.

This patent is subject to a terminal disclaimer.

(21) Appl. No.: 12/251,852

(22) Filed: Oct. 15, 2008

(65) Prior Publication Data

US 2010/0093277 A1 Apr. 15, 2010

(51) Int. Cl.
*H04B 5/00* (2006.01)
*H04B 7/00* (2006.01)

(52) U.S. Cl. .................................... 455/41.1; 455/41.2

(58) Field of Classification Search .................. 455/41.1, 455/41.2, 41.3, 566, 466, 550.1; 707/706, 707/707

See application file for complete search history.

(56) References Cited

U.S. PATENT DOCUMENTS

| | | | |
|---|---|---|---|
| 7,126,481 B2 | 10/2006 | Veikivi et al. | |
| 7,213,766 B2 | 5/2007 | Ryan et al. | |
| 7,412,224 B2 | 8/2008 | Kotola et al. | |
| 7,965,981 B2 * | 6/2011 | Bloebaum et al. | 455/41.1 |

FOREIGN PATENT DOCUMENTS

| | | |
|---|---|---|
| WO | WO 2008/039234 A1 | 4/2008 |
| WO | WO 2008/066989 A1 | 6/2008 |

OTHER PUBLICATIONS

International Preliminary Report on Patentability dated Jan. 25, 2011 issued in corresponding PCT application No. PCT/US2009/043256, 7 pages.
International Search Report dated Aug. 13, 2009 issued in corresponding PCT application No. PCT/US2009/043256, 12 pages.

* cited by examiner

*Primary Examiner* — Eugene Yun
(74) *Attorney, Agent, or Firm* — Snyder, Clark, Lesch & Chung, LLP

(57) ABSTRACT

A method and apparatus are disclosed for aiding shoppers. A shopper enters a product search query into a hand-held device and, via Near-Field Communication (NFC) technology, transfers the query to a terminal at a shopping establishment. The terminal forwards the search query to a search engine over a network and the search engine, after consulting a database, returns results meeting the criteria of the search query to the terminal for presentation on a display at the terminal. The shopper is then offered the option of transferring the results data, via NFC devices located in the hand-held device and the terminal, from the terminal to a memory in the hand-held device.

18 Claims, 6 Drawing Sheets

NEAR FIELD COMMUNICATION SEARCH FOR MOBILE COMMUNICATION DEVICES

TECHNICAL FIELD

The present disclosure is related to Near Field Communication (NFC) technology, more particularly to utilization of near field communication in a mobile communication device for searching, locating, storing, and displaying information about products associated with an establishment.

BACKGROUND

Various advancements have been developed for providers to make product and service information available to interested individuals. A personal computer (PC) user may remotely access such information, at leisure, via provider websites available on the Internet. In commercial establishments, where Internet connections may be unavailable or limited in performance (e.g., by cellular coverage), various solutions have been implemented to provide access to a product or service database. Typically, bar codes are applied individually to items in an establishment, thereby permitting an individual to apply an optical bar code reader and obtain displayed information about a particular item. Radio-Frequency Identification (RFID) technology is another alternative. Local area networks in the establishments provide information for display. Interactive user terminals may be provided to interface the user with the local area network.

The conventional methods have inherent disadvantages. For example, considerable expense in cost and manpower is incurred by bar-coding and updating the plurality of items contained in an establishment. Provision of a plurality of user-interactive terminals throughout the premises also incurs expense. A further disadvantage is that an individual has no easy way to save acquired information for consideration after leaving the premises.

Accordingly, the need exists for an improved method by which an individual can obtain access to information about items of interest. Such a method should permit user portability and offer the user the capability of saving information requested.

SUMMARY OF THE DISCLOSURE

A simple and effective searching aid for products or services offered by a commercial establishment is available to patrons at the establishment premises. A user equipped with a portable, hand-held NFC-enabled communication device can enter a search query, pertaining to a desired product or products, or services, into the hand-held device. The hand-held device can be placed within range of a NFC-enabled terminal at the establishment. The terminal can then initiate a search of a database associated with the establishment. The database may comprise data relating to all merchandise or services available at the establishment. The search results can be displayed at the terminal and may include an option of storing the search results in a memory of the portable, hand-held, device. The search results can be stored in a memory of the portable, hand-held device either directly from the NFC-enabled terminal at the establishment or from a search engine over a communication link having a greater capacity than that provided by an NFC link.

The hand-held device may be exemplified by a mobile telephone comprising a controller, memory, a user input interface and near field communication (NFC) device. A user can formulate a search query, which, under the control of the controller, can be transmitted via NFC communication to a terminal of an establishment. The terminal may reside, for example, in a kiosk within or without the establishment.

The user may activate a product search application stored in the mobile communication device to formulate a search query. A menu displayed on the mobile communication device may contain options for selection in formulating the query. The query, transmitted to the establishment terminal by near field communication, elicits access of a search engine, which may be remote from the terminal. A response to the query may comprise information concerning the availability of requested merchandise and location of requested merchandise, if available. The response may include an image of the requested merchandise that can be displayed at the terminal.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

The present invention is illustrated by way of example, and not by way of limitation, in the figures of the accompanying drawing and in which like reference numerals refer to similar elements and in which.

DETAILED DESCRIPTION

Figure 1:
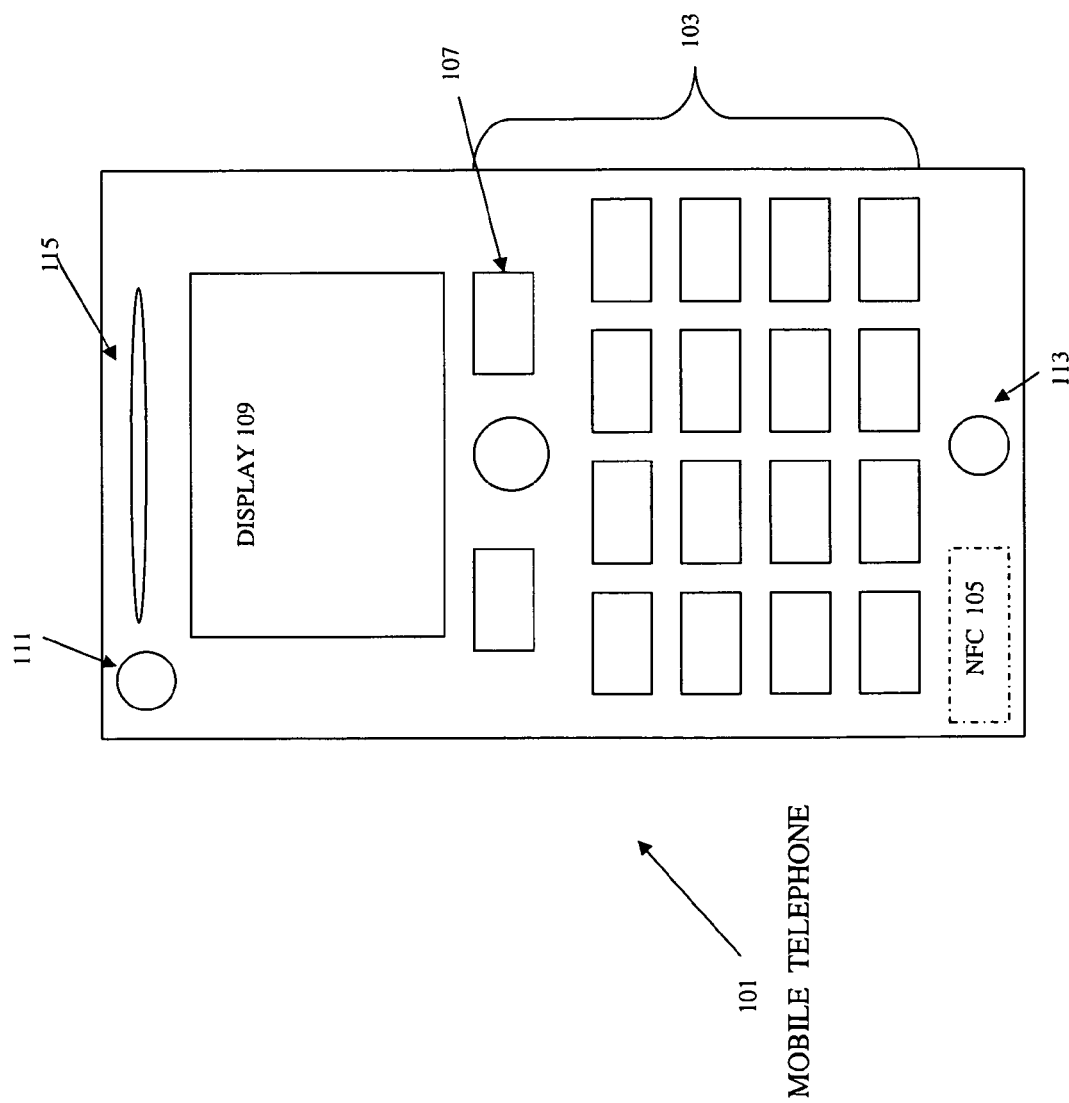
FIG. 1 is an illustrative view of structure of an exemplary mobile phone having NFC search capability.

Embodiments of the present invention will be described hereinafter with reference to the accompanying drawings. In the following description, the constituent elements having substantially the same function and arrangement are denoted by the same reference numerals, and repetitive descriptions will be made only when necessary.

A hand-held communication device is represented by a mobile phone 101 in FIG. 1. The mobile phone, alternatively, may be embodied within any suitable housing (or casing), such as a fold (or clamshell) housing, slide housing, or swivel housing. Mounted on the housing surface are conventional elements such as display 109, keypad 103, microphone 113, and speaker 115. Additional user function keys, such as hot key 107, are provided. The specific arrangement of user function keys is merely exemplary. The mobile phone additional is equipped with near field communication (NFC) device 105 and LED indicator 111. NFC device 105, instead, may be contained within the phone housing for protective purposes.

Figure 2:
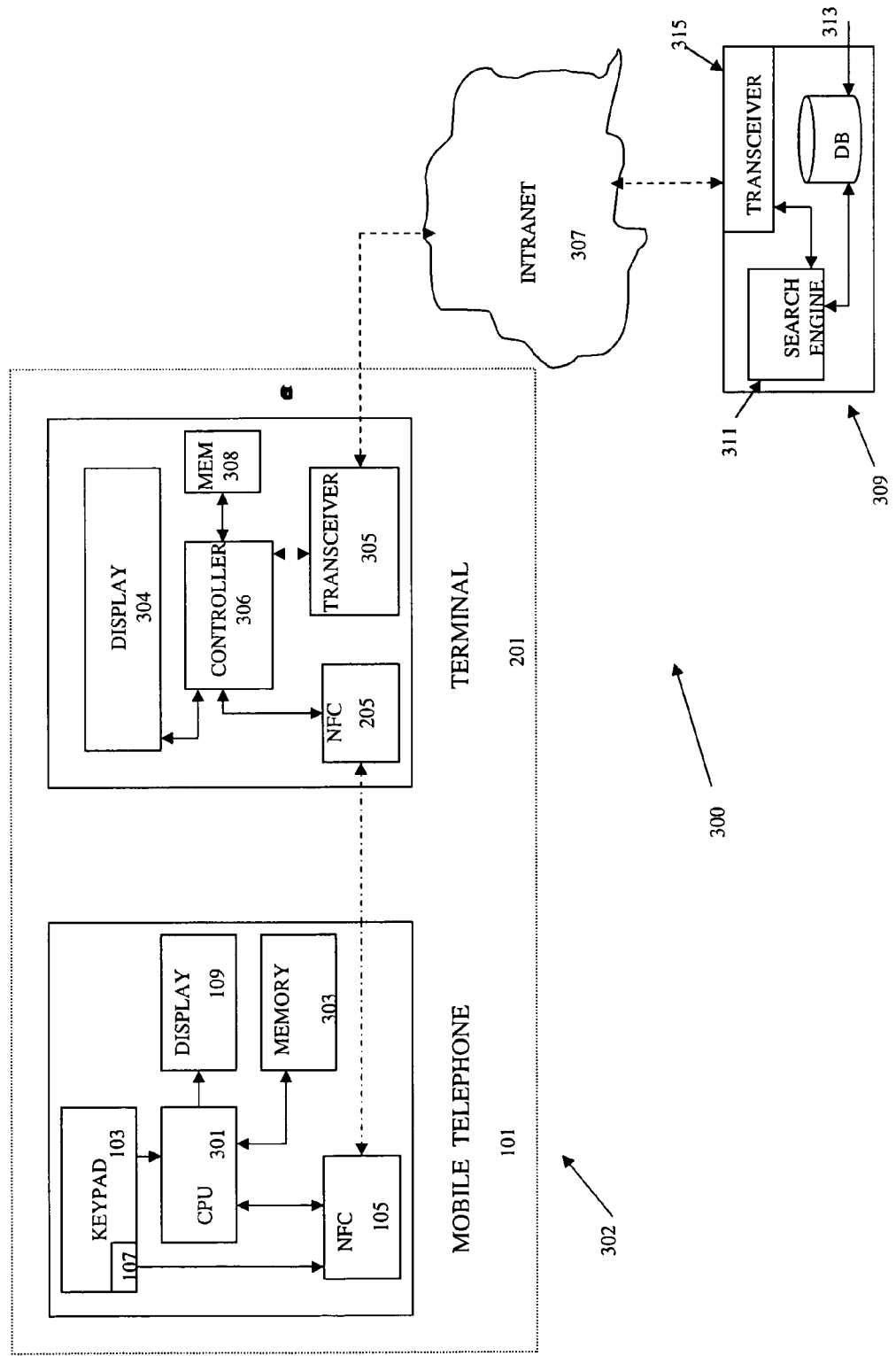
FIG. 2 is a block diagram of a NFC-assisted search system for use in conjunction with the mobile phone shown in FIG. 1.

FIG. 2 is a block diagram of an NFC-assisted search system for use in conjunction with the mobile phone shown in FIG. 1. Block 302 represents mobile phone 101 in proximity to a terminal 201 and within NFC range of the terminal's NFC device 205. Internal elements of the mobile phone 101 are CPU 301 and memory 303. Terminal 201 comprises controller 306, memory 308, display 304 and NFC device 205. Transceiver 305 in the terminal 201 provides communication with a search engine and peripheral unit 309 via a wireless local-area network, such as intranet 307. Peripheral unit 309 comprises search engine 311, database 313 and transceiver 315. Transceiver 315 is coupled to the intranet 307. Peripheral unit 309 may be located remotely or on site at the establishment premises.

NFC devices 105 and 205 can be full capacity NFC devices, i.e., they have two-way capability for transmitting and receiving. Such two-way NFC devices and their manner of operation are known to those skilled in the art. As mobile phone 101 and terminal 201 are within NFC range of each other, near field communication between these devices can take place. As well known, NFC is a short-range wireless connectivity technology standard that has been designed for simple and safe communications and data transfers between electronic devices. By bringing two NFC-enabled and compatible devices within a few centimeters of each other, fast data transfers are possible.

When a search of items offered by an establishment associated with terminal 201 is desired, keypad 103 of the mobile phone 101 may be used for formulating search queries. Activation of an appropriate software application, stored in a CPU 301 can be initiated, for example, by depression of a "hotkey" 107. Activation may present a menu on display 109, wherein user interaction in the search formulation is facilitated. Search queries may be formulated via keypad 103 through use of known Boolean operators, such as AND, OR, NOR, NOT. These operators can be physically entered on the keypad by way of alphanumeric keys or the mobile telephone may have "hot-keys," one for each operator, similar to special purpose "+," "−," "×," and division keys on standard calculators.

The input of a search query is not limited to the use of a keypad. For example, input of a search query into the mobile phone 101 may be by voice command, employing well-known voice recognition software. For example, when a mobile phone 101 comprises the appropriate voice recognition software, a user would press the "hot-key" 107 and, while holding the key in a depressed position, vocally input the search query. Alternatively, pressing the "hot-key" 107 once could activate both the voice processing application and the search query application, wherein, after vocally inputting the search query, the "hot-key" 107 could be pressed again to deactivate both the voice processing and search query applications.

After the search query has been formulated and entered, the user can position the mobile telephone within NFC range of the terminal 201, as illustrated in FIG. 2. An NFC communication is thus established to transfer the search query to the terminal. Visual indication of a successful data transfer can be indicated to the user by activation of LED 111. Such indication may be accompanied by an audio alert.

Terminal NFC device 205 will read the received NFC communication. The search query is transmitted via transceiver 315 and Intranet 307 to search engine 311. Search engine 311 accesses database 313 to obtain search results, which are then transmitted back to terminal 201 for display at display 304. An option may be provided the mobile phone user to receive the search results for storage in memory 303.

Search queries can be saved in the memory 303 of mobile phone 101. Stored searches are thus available to the user for comparison shopping at other establishments. A previous search query can be recalled and then transmitted by near field communication with another NFC device equipped terminal. The user can compare the search results obtained with previous search results, which may have been saved.

Figure 3:
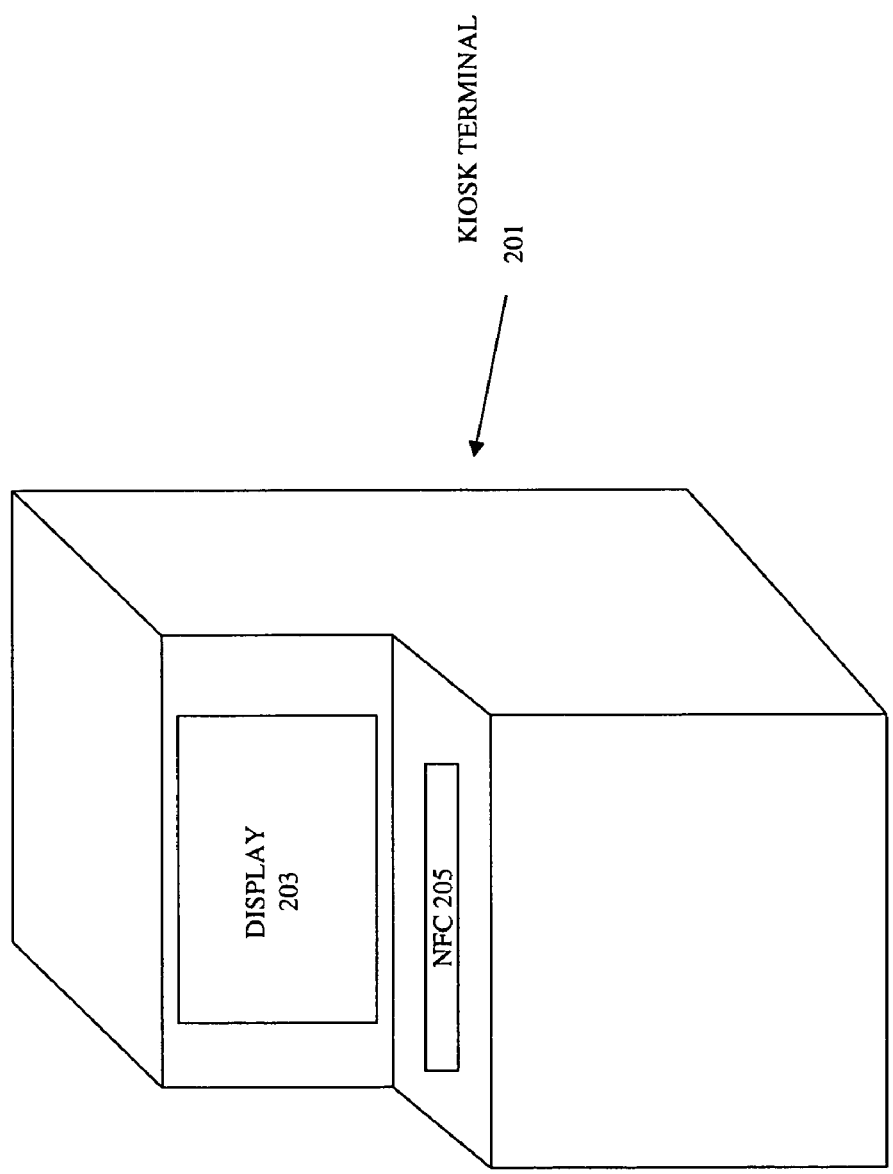
FIG. 3 is an illustrative view of a kiosk terminal for NFC communication with the mobile phone in the system of FIG. 2.

FIG. 3 is an illustrative view of a kiosk terminal for NFC communication with the mobile phone in the system of FIG. 2. The illustrated kiosk terminal may be located outside of its related establishment, for example, in a shopping mall. The terminal of FIG. 2 may alternatively be located within a commercial establishment without the need for physical embodiment within a kiosk. The kiosk terminal can take the appearance of a "dumb" terminal having only display 203 and NFC device 205 tag visible to users.

Figure 4:
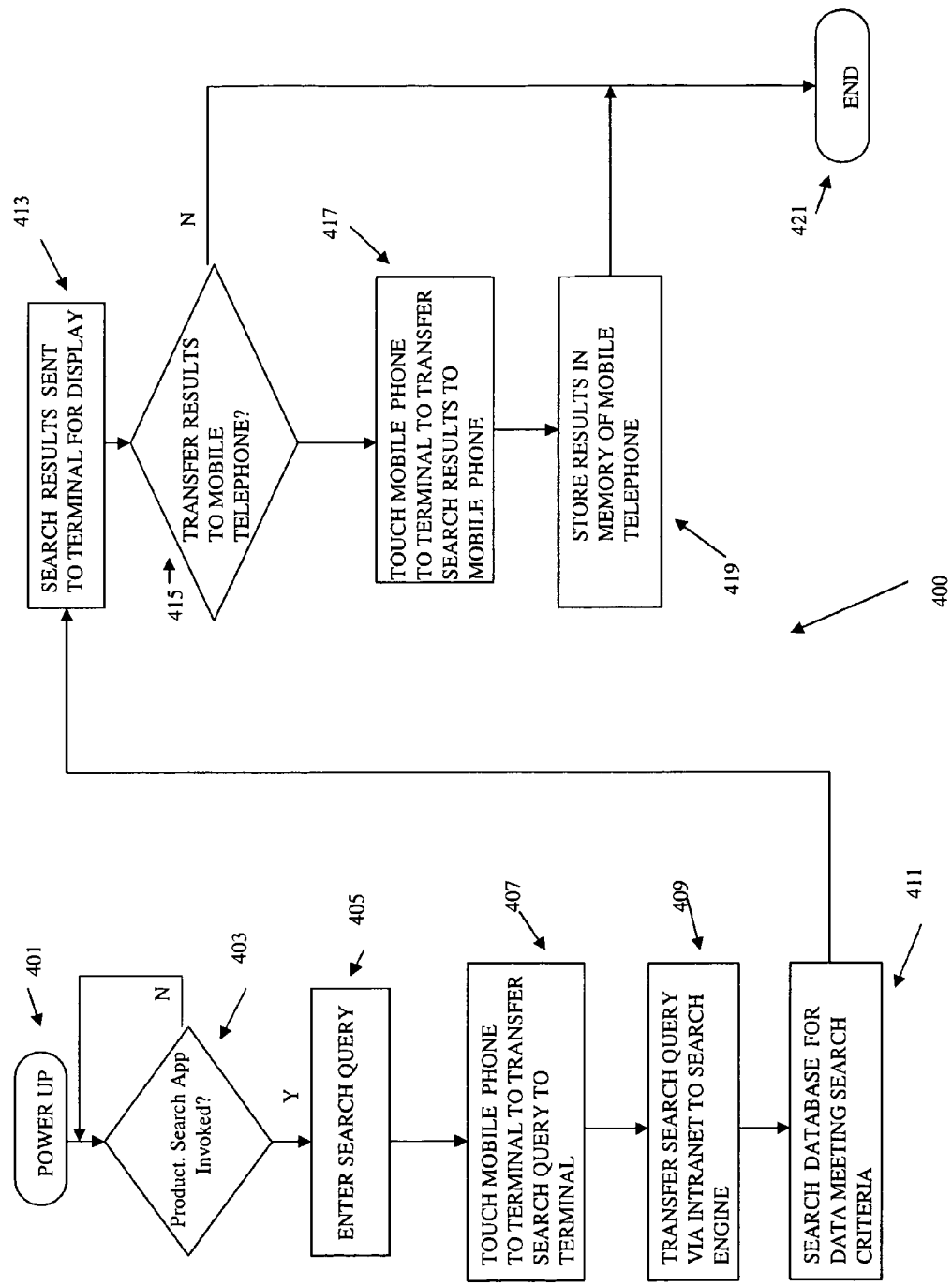
FIG. 4 is a flowchart of a NFC-assisted product search.

Referring to FIG. 4, flowchart 400 illustrates an exemplified operation of the NFC-Assisted product search. A handheld device 101 is powered on at step 401. At 403, determination is made as to whether the user has invoked the product search application program by, for example, depressing hot key 107 in FIG. 1. If not, the process returns to the top of step 403 to await such application program activation. If the application program has been invoked, then the process proceeds to step 405 wherein a user enters his/her search query into the mobile telephone 101 via a keypad 103. Entry may take the form of appropriate keystrokes employing Boolean operators, or it may be entered from a menu on the display 109. Previous search queries may be stored in memory 303 and accessed by CPU 301. For example, if a user is interested in searching for men's shirts in a size large, and in a red or blue color, but is not interested in fitted shirts, the user may enter, via the keypad, "large AND men AND shirt AND (red OR blue) NOT fitted." The search query may also be retrieved from a list of previous search queries by accessing a menu on the display 109, and scrolling down a list of previous search queries.

Once the search query has been entered, the user touches the mobile telephone 101 to the appropriate portion of the terminal 201 at step 407 in order to begin transfer of the search query, via the NFC devices 105 and 205, to the terminal 201. The search query may be stored temporarily in memory 308. The terminal 201 transfers this search query, via an intranet 307 or other network, to a search engine, 311 at step 409. To inform the user of successful data transfer, an indicator can be activated at terminal 201, as well as NFC communication by terminal 201 to mobile phone 101 for activation of LED 111.

At step 411, search engine 311 searches a database 313 for items that might meet the search query criteria. The search engine 311 and database 313 may be remote from the terminal or reside in proximity thereof. While an Intranet communication has been exemplified, such communication paths may include local area and/or wide area networks. If and when results are found, those results (or a message, such as "No Results Found. Please Try Again") are sent back to terminal 201 for display on display 304 at step 413. The search result may display various kinds of information including but not limited to availability of the product in that establishment, availability in other, related or non-related, establishments, quantity in stock, where such products may be found within the establishment (e.g., aisle number), expected delivery date of more of the item(s), price, any special promotions or rebates, etc.

The user can decide if this information is useful or not. If the user wishes to purchase a searched item, the user might note the location of the item in the establishment, such as the aisle number, and retrieve the item without the need to save the displayed information. In other circumstances, the user might wish to save the search results for later use. The user thus may be given a displayed option at step 415.

The user can merely read the results and use the results as the user sees fit, ending the process at 421, or can choose to transfer those results for storage in the memory 303 of mobile telephone 101 for possible later use. If the user chooses to save the results, this choice can be implemented by retouching the mobile telephone 101 to the terminal 201 to place NFC devices 105 and 205 in close proximity to each other, at step 417.

The software application in CPU 301 can set the NFC device 105 to automatically determine the direction of data transfer by, for example, setting a time period after a search query is transferred to the terminal. If the mobile telephone is once again touched to the terminal during that time period, i.e., if the NFC devices 105 and 205 are again placed in contact during that time period, then NFC device 105 can be switched from a transmit mode to a receive mode. The search results are then transferred to the memory 303 of mobile telephone 101 at step 419. At this point, the process is ended at step 421

Figure 5:
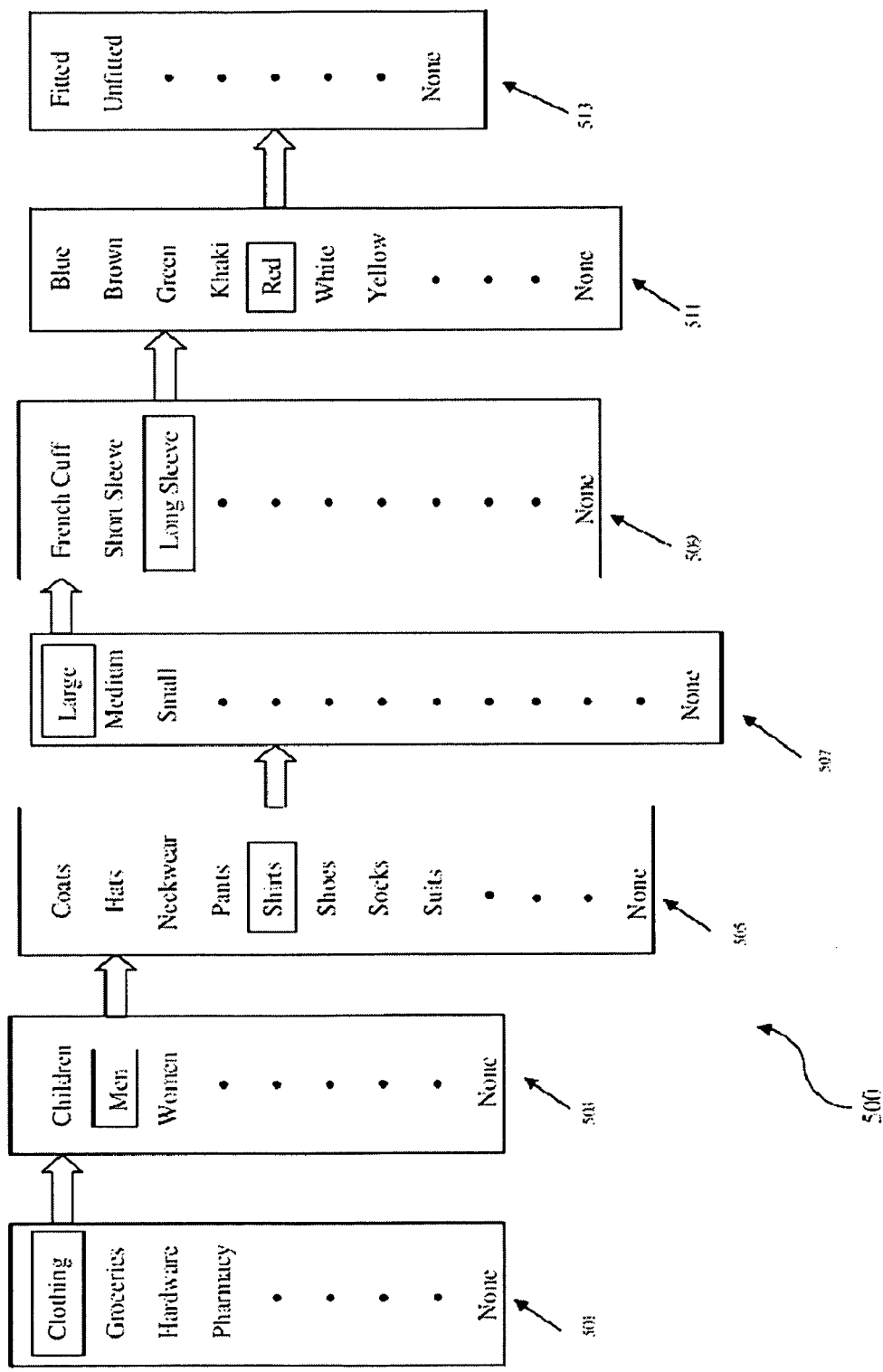
FIG. 5 is a chart representing product search query menu operation.

FIG. 5 is an illustration of an alternative manner of entering a search query wherein a menu of options is displayed on the display 109 of the mobile communication device 101 upon activation of the product search application.

A series of menus and sub-menus is depicted at 500. Upon activation of the product search application, a main menu 501 is displayed on display 109 of mobile communication device 101. It is understood that another type of display may be generated upon activation, wherein names of various establishments, or a welcome message may also be displayed. For illustrative purposes, a main menu shows types of products offered in a particular establishment. As would also be understood, the menu may also display available services, or a combination of products and services.

Main menu 501 lists available types of products including clothing, groceries, hardware, pharmacy, etc. A user may choose "clothing" by touching with a finger or stylus or other implement, or otherwise highlighting this choice. Upon choosing the "clothing" option, a sub-menu 503 is displayed in place of main menu 501. Sub-menu 503 lists types of clothing, such as "men," "women," and "children." Upon selecting "men," for example, a new sub-menu 505 opens, replacing sub-menu 503 on the display screen. Sub-menu 505 may display various kinds of men's clothing carried by the particular establishment. These may include, for example, coats, hats, neckwear, pants, shirts, shoes, socks, suits, etc. Upon the user choosing "shirts," another sub-menu 507 relating to sizes is opened in place of sub-menu 505. Upon choosing "large," for example, a new sub-menu 509 relating to the types of sleeves, e.g., French cuff, short sleeve, long sleeve, etc., is opened. Upon choosing the type of sleeve, e.g., "long sleeve," a sub-menu 511 relating to the choice of color is opened. Upon choosing a color, e.g., "red," a new sub-menu 513, relating to "fitted" or "unfitted" shirts is open.

The number of sub-menus is limited only by imagination, memory resources and how far a user wishes to proceed in the narrowness of the search desired.

Each menu and sub-menu may include a "don't care" or "none" option to permit a user to keep a broad search. For example, if a user does not require any specific color or sleeve style of shirt, the user may choose the "none" option in sub-menus 509 and 511. This choice will result in a search without regard to color or sleeve type. Also, the main menu and sub-menus may be provided with the capability to highlight, or choose, more than one option in each menu or sub-menu. In this manner, for example, a user may want to search for either a blue or a red shirt, but no other color. Accordingly, both the "blue" option and the "red" option may be highlighted.

The main menu and sub-menus of FIG. 5 are listed in alphabetical order merely by example to aid the user in finding the desired choice when scrolling down the various menus. Any well known manner of scrolling can be utilized.

While, thus far, receipt of search results into the mobile telephone 101 has been described with reference to using NFC technology to transfer the results to memory 303 of the mobile telephone 101 by holding the mobile telephone 101 in proximity to terminal 201, it may be desirable in certain circumstances to retrieve the search query results from peripheral unit 309 at a later time, or to retrieve the search query results over a communication link having a greater capacity than that provided by an NFC link.

Figure 6:
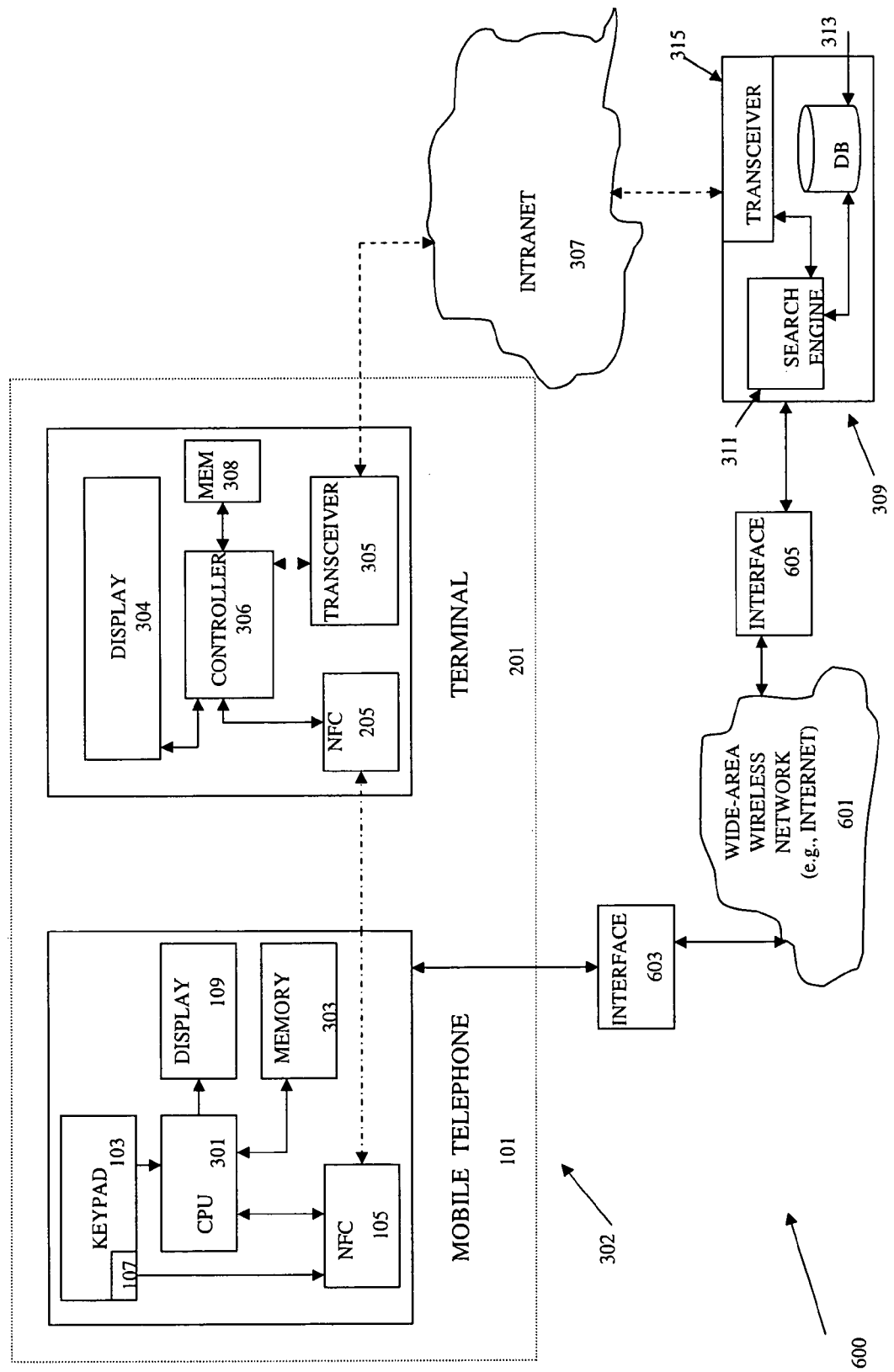
FIG. 6 is a block diagram of a NFC-assisted search system similar to that of FIG. 2 with the added capability of receiving search results by the mobile phone over a high-capacity communication link.

In this case, as depicted in FIG. 6, the peripheral unit 309 of system 600 would send the search results to the mobile telephone 101 over a wireless communications link other than the NFC link between terminal 201 and mobile telephone 101. The system depicted in FIG. 6 is similar to the system depicted in FIG. 2, having many of the same elements. However, FIG. 6 includes additional elements, including a wide-area wireless network 601, such as, for example, the Internet, and interfaces 603 and 605, interconnecting the wireless network 601 with the mobile telephone 101 and the peripheral unit 309, respectively.

In system 600 of FIG. 6, the search query results may be returned to the mobile telephone 101 over the network 601 that is completely distinct from the wireless local-area network, e.g., intranet 307, for a particular establishment. For example, the return of search query results to the mobile telephone 101 by the peripheral unit 309 could be effected over a WLAN or a wide-area wireless data network, such as Internet 601. This would be effected in a well known manner via interfaces 603, between mobile telephone 101 and the wireless network 601, and 605, between peripheral unit 309 and the wireless data network 601.

In some cases, rather than using the NFC link described above, terminal 201 may include a WLAN transceiver configured to return search query results to mobile telephone 101 after receiving the results from peripheral unit 309. In other cases, such as that depicted in the system 600, the search query results may be returned via means that are completely independent from the terminal 201. While the network 601 is depicted as a wide-area wireless data network, such as the Internet, the search query results may be returned via other means, such as any of a variety of well known mobile communication protocols, e.g., by SMS, wireless e-mail, or the like. In these cases, while the search query is initiated via the NFC path described above, the response to the search query would be sent to the mobile communication device 101 via other means, such as via the wireless data network 601, or via a variety of well known mobile communication protocols, providing more flexibility for the user.

Those skilled in the art will appreciate that the use of a separate wireless network for delivery of search results may provide greater bandwidth, facilitating the provisioning of more elaborate search results, including the use of graphics, animation, video, and the like.

As can be appreciated, various advantages are provided by the present disclosure. The use of a "bare-bones" terminal is advantageous to the merchant in that it is relatively inexpensive, provides shopper self-service, and requires fewer personnel to answer questions regarding information about merchandise for sale. Another advantage is that there is a splitting of the user interface between the store terminal and the portable, hand-held device. As the mobile telephone contains a keypad for entering the search queries, no keypad is required on the terminal in the store.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, although the disclosure is exemplified in the context of a terminal associated with a retail establishment, the terminal may also be in a wholesale establishment or any other establishment or institution wherein information about offered products or services is desired. The specification and the drawings are accordingly to be regarded in an illustrative rather than restrictive sense.

What is claimed is:

1. A method, comprising:
activating a product search application on a mobile device;
receiving, by the mobile device, a search query from a user;
physically contacting the mobile device to a portion of a terminal;
wirelessly transmitting the query from the mobile device to the terminal via a near field communication (NFC) link in response to the contacting;
receiving a response to the transmitted query by the mobile device via a wireless network different than the NFC link; and
displaying the response on the mobile device.

2. The method of claim 1, wherein the search request relates to products associated with an establishment.

3. The method of claim 2, wherein the response comprises information concerning the availability of requested products.

4. The method of claim 2, wherein the response comprises information concerning a physical location of products matching the search query.

5. The method of claim 2, wherein the response comprises one or more images of products matching the search query.

6. The method of claim 1, wherein receiving the response to the transmitted query further comprises receiving, by the mobile device, search results directly from a search engine remote from the terminal via the wireless network different than the NFC link.

7. The method of claim 6, wherein receiving the search query further comprises receiving search terms and Boolean operators.

8. The method of claim 1, further comprising:
receiving, by the mobile device from the terminal, a notification of a successful query transfer via the NFC link; and
activating, at the mobile device an indicator at the mobile device based on the receiving.

9. The method of claim 1, wherein the wireless network different than the NFC link comprises:
a wireless local-area network;
a wide-area wireless data network; or
a wireless short message service (SMS) network.

10. An apparatus comprising:
a mobile communication device comprising a mobile device controller, memory, a display, a user input interface, a first near field communication (NFC) device, and a wireless network interface different than the first NFC device; and
a terminal comprising a second NFC device and a network interface display,
wherein the mobile device controller is configured to:
receive a product search query from a user via the user input interface; and
transmit the search query to the terminal via an NFC link between the first NFC device and the second NFC device,
wherein the terminal is configured to transmit the search query to a search engine remote from the terminal via the network interface, and
wherein the mobile device is configured to receive search results from the search engine via the wireless network interface and display the received search results to the user via the display.

11. The apparatus of claim 10, wherein the search query relates to products associated with an establishment.

12. The apparatus of claim 10, wherein the terminal is located in a kiosk in an establishment.

13. The apparatus of claim 10, wherein the mobile communication device comprises a cellular telephone.

14. The apparatus of claim 10, wherein the user input interface comprises a plurality of keys.

15. The apparatus of claim 14, wherein one of the keys is a hot key for activating a product search application.

16. The apparatus of claim 10, wherein the terminal further comprises memory for storing data related to a user query.

17. The apparatus of claim 10, wherein the mobile communication device is configured to receive data representing the search results from the terminal via near field communication and to store results transferred from the terminal.

18. The apparatus of claim 10, wherein the mobile communication device is configured to receive data representing the search results over a wireless network, the wireless network being one of a wireless local-area network, a wide-area wireless data network, and a wireless short message service network.

* * * * *

UNITED STATES PATENT AND TRADEMARK OFFICE
CERTIFICATE OF CORRECTION

PATENT NO. : 8,116,680 B2  Page 1 of 1
APPLICATION NO. : 12/251852
DATED : February 14, 2012
INVENTOR(S) : L. Scott Bloebaum et al.

It is certified that error appears in the above-identified patent and that said Letters Patent is hereby corrected as shown below:

In claim 10, column 8, line 19, delete the word "display."

Signed and Sealed this
Twentieth Day of March, 2012

David J. Kappos
*Director of the United States Patent and Trademark Office*